Patented Feb. 10, 1948

2,435,674

UNITED STATES PATENT OFFICE 2,435,674

BUTADIENE-1,3-ETHYL ALPHA PHENYL-ACRYLATE COPOLYMER

Albert M. Clifford, Stow, Ohio, assignor to Wingfoot Corporation, Akron, Ohio, a corporation of Delaware No Drawing. Application June 24, 1941,
Serial No. 399,505

1 Claim. (Cl. 260—84.5)

This invention relates to synthetic rubber and, more particularly, to plastic masses having rubber-like properties obtained by copolymerization of two or more polymerizable substances.

Various monomeric substances have been polymerized to yield masses which are plastic, flexible and even elastic. Some of these are suitable for use in place of rubber. It has now been found that substances from the class of esters of those acrylic acids which are substituted in the alpha position by an aromatic radical, particularly an aryl radical, may be copolymerized or interpolymerized with a butadiene to yield rubber-like copolymers. The alcohol radical of the ester may be alkyl, alicyclic or aralkyl, aliphatic radicals being preferred. In order to secure materials with the desired rubber-like characteristics, it is necessary to effect the polymerization in an emulsion, such emulsion usually containing an emulsifying agent, an oxidant, a catalyst and such other ingredients as may be found requisite or desirable to promote the polymerization. Also, the emulsion is customarily aqueous in nature although other emulsions are contemplated.

In developing the present invention, it was observed that rubber-like copolymers could be obtained when substances of the two above-defined classes were interpolymerized in an aqueous emulsion but not when the same substances were polymerized in a solvent or were mass polymerized. Plastics obtained by these latter methods do not possess the property of elasticity to a sufficient degree to be used in place of rubber, although they do possess considerable flexibility. On the other hand, the products of emulsion polymerization prepared in accordance with the practice of the present invention possess the property of elasticity to a degree equal to at least 50% of that of natural rubber similarly compounded. That is to say, tire tread stocks made up according to the same formula with natural rubber and with a synthetic, rubber-like material prepared as described herein will be elastic and extensible to such a degree that each may be classed as a satisfactory rubber compound. The synthetic rubber, in such a comparison, exhibits at least 50% of the elasticity of the natural rubber stock.

The synthetic rubbers may be prepared by interpolymerization of butadiene, isoprene, 2,3-dimethyl butadiene, chloroprene and the like butadiene compounds with an acrylic acid ester such as methyl atropate, ethyl atropate, propyl atropate, isopropyl atropate, cyclohexyl atropate, benzyl atropate, and similar esters of alpha aromatic substituted acrylic acids, such as the alkyl esters of alpha para tolyl acrylic acid, alpha ortho tolyl acrylic acid, alpha meta tolyl acrylic acid, alpha xylyl acrylic acid, and alpha naphthyl acrylic acid. In general, while any butadiene may be copolymerized with any ester of an alpha aromatic substituted acrylic acid, it is preferred to employ the hydrocarbon butadienes on the one hand and the aliphatic esters of alpha aryl substituted acrylic acids on the other hand.

To illustrate the preparation of the described synthetic rubbers, the following example is given, although it will be understood that no limitation is intended thereby.

An emulsion is made up containing 10 cc. of 5% Aquarex-D (sodium lauryl sulfate) solution, 10 cc. of a McIlvaine, citrate-phosphate buffer solution, 0.133 gram of sodium perborate and 0.48 gram of carbon tetrachloride, all in aqueous solution. To this is added 6 grams of butadiene-1,3 and 4 grams of ethyl atropate and the mixture is agitated in a closed vessel at a temperature of about 38° C. When the buffer used consisted of 10 cc. of a mixture of 48.5 cc. of 0.2 M. $Na_2HPO_4$ and 51.5 cc. of 0.1 M. citric acid, a 68% yield of a soft, very tough, good-looking rubber was obtained in 7 days. The elapsed time can of course be reduced by appropriate means while still obtaining a rubber of substantially the same characteristics.

Copolymers of any of the other butadienes with any of the esters mentioned above may be prepared in a similar manner and, of course, the conditions of the polymerization may be changed, provided only that emulsion polymerization be employed. The proportions of the monomer constituents of the polymerizable mixture may be varied as desired, but at least 20% of each should be present to secure copolymers having satisfactory rubber-like properties.

To indicate the properties of a rubber prepared from one of these copolymers, a mixture of butadiene and ethyl atropate was polymerized in 60:40 ratio. To the product thus obtained was added 3% of phenyl beta naphthylamine. This was compounded and cured in a test formula containing the following ingredients:

| | Parts |
|---|---|
| Copolymer | 103.0 |
| Zinc oxide | 5.0 |
| Sulfur | 1.6 |
| Stearic acid | 2.0 |
| Carbon black | 39.2 |
| Benzothiazyl diethyl sulfene amide | 1.0 |

The physical data obtained were tabulated as follows:

| Cure Min., °F. | Tens., kg./cm.² | Elong., per cent | 300% |
|---|---|---|---|
| 35/260 | 14 | 625 | 9 |
| 50 | 78 | 600 | 24 |
| 70 | 85 | 450 | 44 |
| 100 | 113 | 440 | 60 |
| 140 | 110 | 405 | 67 |

It will be seen from this that the copolymer was distinctly rubber-like in its properties when compounded in the usual manner, the elongation at break showing an extensibility of from 400 to 600% and the force required to stretch the rubber to 300% of its original length being comparatively small, as is characteristic of a rubber stock.

The interpolymerization of the acrylate and the butadiene compound or of multi-component systems in which more than two monomers are present but including representatives of these two classes, may be accomplished by emulsion polymerization in the manner customarily employed. The emulsion will contain an emulsifying agent, such as the higher alkyl sulfates, sodium oleate, sodium alkylated naphthalene sulfonates, etc. An oxidant, such as sodium perborate, benzoyl peroxide, hydrogen peroxide and the like is also employed and a catalyst, such as carbon tetrachloride, ethylene dichloride, etc. may be used. The temperature employed ranges from room temperature to as high as 80° C. but is preferably between 30–50° C. The polymerization is conducted for such period of time, usually several hours, but often over a day is required, as will give a latex of the required characteristics.

While there have been described above the preferred embodiments of the invention, it will be apparent to those skilled in the art that various modifications and changes may be made therein without departing from the spirit of the invention or from the scope of the appended claim.

This application is a continuation-in-part application of my Patent U. S. 2,279,293, issued April 14, 1942, on application Serial No. 199,184, filed March 31, 1938.

I claim:

A synthetic-rubber resulting from the polymerization of an aqueous emulsion of a mixture consisting of 60 parts of butadiene-1,3 and 40 parts of ethyl alpha-phenylacrylate.

ALBERT M. CLIFFORD.

REFERENCES CITED

The following references are of record in the file of this patent:

UNITED STATES PATENTS

| Number | Name | Date |
|---|---|---|
| 2,099,047 | Bradshaw | Nov. 16, 1937 |
| 2,234,204 | Starkweather | Mar. 11, 1941 |
| 2,271,384 | Arnold | Jan. 27, 1942 |

FOREIGN PATENTS

| Number | Country | Date |
|---|---|---|
| 522,981 | Great Britain | July 2, 1940 |